Sept. 8, 1964  R. A. WOLFE  3,148,038
BONDING OF METAL MEMBERS
Filed May 27, 1958
Fig. 1.
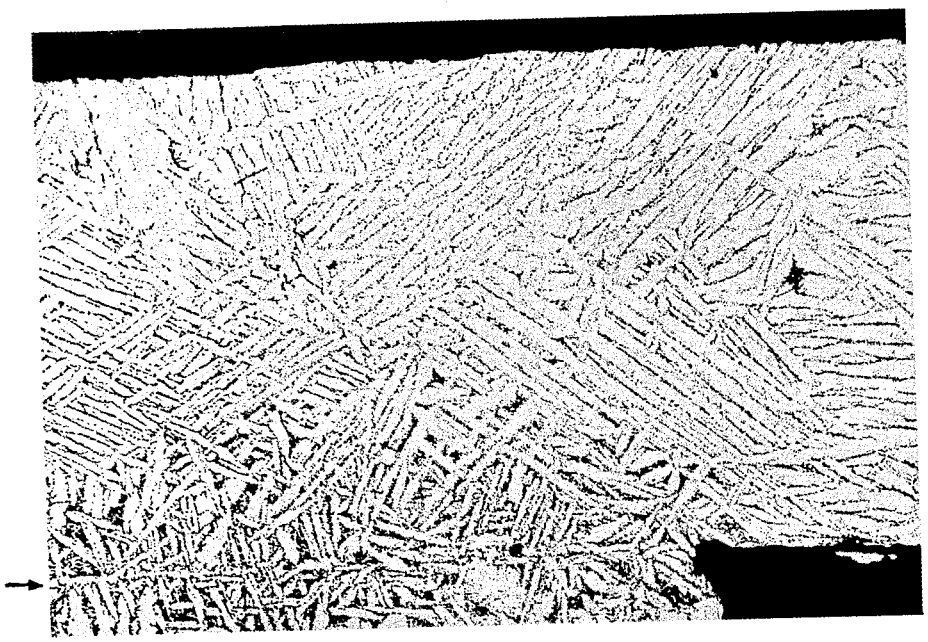
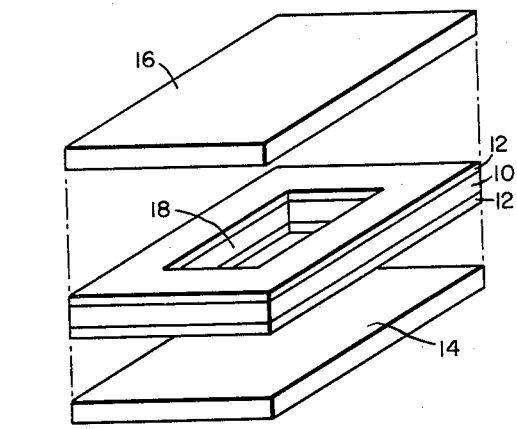
Fig. 2.
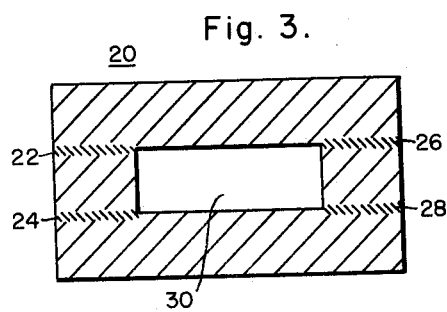
Fig. 3.

United States Patent Office 3,148,038
Patented Sept. 8, 1964

3,148,038
BONDING OF METAL MEMBERS
Richard A. Wolfe, West Mifflin, Pa., assignor to Westinghouse Electric Corporation, East Pittsburgh, Pa., a corporation of Pennsylvania
Filed May 27, 1958, Ser. No. 738,113
8 Claims. (Cl. 29—194)

This invention relates to the bonding of metal members and to articles of manufacture comprising the bonded metal members.

In particular, this invention relates to the metallurgical bonding of metal members selected from the group consisting of zirconium and base alloys thereof.

For some applications it is necessary to bond together metal members which consist of zirconium and base alloys of these metals. Brazing techniques have proved satisfactory for some applications; however, bonds formed by brazing have poor resistance to corrosive media such as high temperature water, steam and the like. Further, the mechanical strength of these bonds is not adequate for many high temperature applications.

It is therefore desirable to have available a method of bonding together metal members consisting of zirconium and base alloys of these metals, which method will provide a bond that is mechanically strong at elevated temperatures and is resistant to highly corrosive media.

The object of this invention is to provide a method for metallurgically bonding metal members selected from the group consisting of zirconium and base alloys of zirconium by an eutectic diffusion bonding process, which bond has good mechanical strength at elevated temperatures and good resistance to corrosion.

Another object of this invention is to provide metallurgically bonded metal members selected from the group consisting of zirconium and base alloys of zirconium, by a eutectic diffusion bonding process, which metallurgical bond has good mechanical strength at elevated temperatures and good resistance to corrosion.

Other objects of this invention will, in part, be obvious, and will, in part, appear hereinafter.

For a better understanding of the nature and the objects of this invention, reference should be had to the following detailed description and drawing, in which:

FIGURE 1 is a photomicrograph taken at a magnification of 100 times of a cross section of two metal members metallurgically bonded in accordance with this invention and showing the bond interface of the members;

FIG. 2 is a view in perspective of metal members prior to bonding the members in accordance with this invention; and FIG. 3 is a cross-sectional view through a bonded member prepared in accordance with this invention.

In accordance with this invention, it has been discovered that metal members selected from the group consisting of zirconium and base alloys of zirconium can be satisfactorily bonded by a novel method comprising eutectic diffusion to form at the interfaces thereof, a strong metallurgical bond.

This method is accomplished by applying to at least one of the members to be bonded, at the surface where the members are to be bonded, a substantially uniform microscopically thin coating of a bonding agent selected from the group consisting of nickel, copper, silver, iron, and alloys of two or more. The metal members are assembled in contact with one another at the surfaces to be bonded and in the position in which they are to be united, and then heated to a temperature at which the applied bonding agent and the base metal of the members to be bonded initially form a fused eutectic alloy layer at the interface of the metal members. Heating at the fusion tempera-ture is continued until the applied bonding agent has been diffused into the adjacent surfaces of the metal members. After substantially complete diffusion of the bonding agent into the metal members, the bonded metal members are then cooled to room temperature. The metal members are thus permanently bonded together by a strong metallurgical bond, which metallurgical bond has high strength at elevated temperatures, good ductility and good resistance to highly corrosive mediums.

No solid eutectic alloy or solid bonding agent is present as such at the joint interface. The bond produced has mechanical strength and corrosion resistance substantially the same as that of the metal members themselves. Also the melting point of the bond is substantially the same as the metal of the bonded members.

In carrying out this invention, advantage is taken of the fact that the bonding agent employed, i.e., the metals nickel, copper, silver, iron and alloys of two or more have a definite affinity for zirconium and base alloys thereof, and also that they form therewith, relatively low melting point eutectic alloys.

This invention will be detailed hereinafter with reference to nickel as the bonding agent employed; however, it will be understood that copper, silver, iron and alloys of two or more may be employed with equally satisfactory results.

Furthermore, reference will hereinafter be made to metal members as the members to be metallurgically bonded and it is to be understood that the metal members are prepared from a metal selected from the group consisting of zirconium and base alloys thereof.

In carrying out this invention, a microscopically thin coating of nickel metal is applied to either one or both of the metal members to be bonded, the coating being applied to at least that surface where the members are to be bonded. Application of the coating of nickel can be made in any convenient manner such, for example, as by electrodeposition, vapor deposition, electroless or chemical deposition and the like. Sheets of metal foil of desired thickness may also be employed with satisfactory results. The sheet of metal foil is sandwiched between the surfaces of the metal members to be bonded.

In applying the microscopically thin and uniform coatings of nickel to metal members of zirconium and zirconium base alloys required in carrying out this invention, it is preferred to employ the chemical displacement method of deposition which is described in application Serial No. 715,852, filed February 18, 1958, and assigned to the assignee of the present invention. Reference is hereby made to this application for a detailed description of the method of deposition.

Briefly, the method provides for immersing the zirconium metal member to be plated in an aqueous immersion plating solution for a period of time sufficient to deposit a coating of desired thickness thereon, and thereafter, removing said member from the aqueous solution. The aqueous solution employed contains from 10 to 100 grams, per liter of water in a solution, of a salt of the metal to be deposited on said surface, and from 1 to 10 cc. of hydrofluoric acid (48%) per liter of water in the plating solution, said salt of the metal to be deposited being ionizable in water to produce ions of the metal to be deposited.

The applied thin nickel coating should be of substantially uniform thickness to insure uniform bond strength at the bond interface. Coating thicknesses of about 0.06 mil have proved satisfactory for the purpose of this invention; however, thicknesses of the order of from about 0.10 mil to 0.30 mil are preferred. Thicker coatings may be employed if desired, but they will require prolonged diffusion times. It is preferred to employ a minimum coating thickness consistent with achieving satisfactory metallurgical bonds in order to prevent large changes in the composition of the bonded metal members which might adversely affect the physical properties of the bonded metal members.

The thin nickel coating may be applied to just one or both of the contacting surfaces of the metal members to be bonded. If the coating is to be applied to both members the total thickness of the two applied coatings should fall within the above range of 0.10 mil to 0.30 mil. Thus if a coating thickness of 0.10 mil is desired, a coating of this thickness may be applied to just one of the metal members to be bonded, or if the nickel coating is to be applied to both metal members, each may be treated to apply 0.05 mil of nickel, so that the total thickness of the two applied coatings will be about 0.10 mil.

Owing to the fact that extremely thin coatings of nickel are employed in carrying out this invention it is important that the metal members to be joined be prepared and assembled so as to be in intimate contact with one another at the surfaces where they are to be bonded. The surface may be machined as by milling or grinding to produce closely matching surfaces when superimposed. Any well-known method of maintaining the metal members in contact with one another during the bonding procedure may be employed. Thus, for example, the members may be held together by means of clamps or the members may be spot or fusion welded together at peripheral areas. In bonding together two flat metal members, intimate contact is easily maintained by sandwiching the two members between two heavy flat slabs of graphite having approximately the same dimensions as the members to be bonded.

After the nickel coated metal members have been assembled and forced or held together to maintain intimate contact between the surfaces to be bonded, the assembly is heated in a vacuum or an inert gas atmosphere, such as argon or helium, to a temperature at which a fused eutectic alloy is produced between the metals and the bonding agent at the surfaces to be joined. The vacuum or inert atmosphere is employed because of the high reactivity of zirconium and base alloys thereof with oxygen and like gases at elevated temperatures which condition will adversely affect the physical properties of the bonded members. Thus, for example, oxygen absorbed by zirconium goes into solid solution and makes the metal permanently brittle.

The fused alloy produced at the interface of the members to be bonded results from the formation of a low melting point eutectic of the nickel coating and the zirconium of the metal members. Coatings of copper, iron and silver also produce low melting point eutectic alloys with the base metal present in the metal members to be bonded. The temperature to which the assembly is heated will depend mainly on the melting point of the eutectic alloy that is produced. It is preferred to heat the assembly to a temperature of from about 10° C. to 100° C. above the temperature of the eutectic alloy produced. Thus, temperatures of from about 980° C. to 1030° C. have proved very satisfactory for nickel applied to zirconium and zirconium base alloys for the purposes of this invention.

To provide for satisfactory bonding of the metal members, it is recommended that the heating of the members from room temperature to the eutectic temperature, be relatively rapid, of the order of about 10° C. to 50° C. per minute, so that the fused alloy will form before a substantial amount of the relatively thin metal coating has diffused into surfaces the metal members to be bonded.

After the temperature has been reached at which a fused eutectic alloy is formed at the joint interface, this temperature is maintained for a period of time to allow the fused alloy to diffuse into the surfaces of the metal members being bonded. It has been determined that this temperature should be maintained for at least about 30 minutes and preferably longer to provide for adequate and substantially complete diffusion of the eutectic alloy into the metal members. The bonded metal members are then removed from the furnace and cooled to room temperature.

At the bonded areas there will be a layer or zone comprising an alloy of the base metal and a small proportion of the bonding metal diffused therein. The concentration of the bonding metal, for instance nickel, will be greatest at the mating surfaces, and the concentration thereof will fall progressively with distance from the bond interface. However, the metal adjacent the bond interface will exhibit substantially the same properties as the original metal of the members.

The method of this invention has proved to be highly satisfactory for the bonding of metal members consisting of zirconium base alloys, such, for example, as those known as Zircaloy. Zirconium base alloys which may be bonded in accordance with this invention include those disclosed in U.S. Patent 2,772,964 which is assigned to the assignee of the present invention. Such alloys consist essentially of from 0.1% to 2.5% by weight of tin, a total of at least 0.1% but not exceeding 2% by weight of at least one metal from Period III (and particularly, Series IV) of the Periodic Table selected from the group consisting of iron, nickel and chromium, less than 0.5% by weight of incidental impurities, and the balance zirconium. However, other zirconium base alloys can be bonded by this method with highly satisfactory results. Thus, zirconium with up to 10% of beryllium, and zirconium with up to 10% tantalum and 10% niobium can be employed.

Referring to FIG. 1 of the drawing there is shown a photomicrograph taken at a magnification of 100 times of a section of metal members bonded together in accordance with this invention. The metal members were prepared from a zirconium base alloy known as Zircaloy consisting essentially of, by weight, about 1.5% tin, about 0.10% chromium, about 0.05% nickel, about 0.12% iron, the balance being zirconium and less than 0.5% by weight of incidental impurities, and the bonding agent employed was copper. The arrow indicates the bond interface between the members. It will be noted that there is no layer of undiffused bonding agent or eutectic alloy present between the members. All the bonding agent has been alloyed and diffused into the metal of the bonded members. The structure is essentially continuous except for the barely apparent composition gradient at each side of the interface.

In FIG. 2 of the drawing there are shown three metal members to be bonded together in accordance with this invention. Central filler member 10 is provided with a thin coating 12 of bonding agent on the surfaces thereof where bonding is to be made to flat members 14 and 16. Central filler member 10 is provided with a central opening 18 therethrough, which opening will be totally enclosed after the bonding of members 14 and 16 to central filler member 10 has been effected.

FIG. 3 of the drawing is a cross-sectional view through a metallurgically bonded member 20 produced by bonding together, in accordance with this invention, the members 10, 14 and 16 of FIG. 2. The bonds produced at interfaces 22, 24, 26 and 28 provide a chamber 30 in the member 20. The photomicrograph of FIG. 1 was taken of the upper left-hand corner of such an assembly as shown in cross section in FIG. 3.

In preparing members of the type shown in FIG. 3 of the drawing, i.e., where a chamber is provided between the bonded members, intimate contact between the surfaces to be bonded can be obtained and maintained during the heating cycle by creating a pressure differential between the chamber and the exterior surfaces of the metal members.

Thus, for example, to prepare the metallurgically bonded member 20 of FIG. 3, the members 10, 14 and 16 of FIG. 2 are assembled with central filler member sandwiched between members 14 and 16. The assembly is sealed by fusion welding the outside periphery of the assembly and the chamber is evacuated by conventional well-known methods such, for example, as employing an evacuation tube which leads to chamber 30. The welded evacuated assembly is placed in a suitable furnace containing an inert gas, such as helium, under pressure of from about 10 to 100 pounds per square inch gauge. The assembly is then heated to the desired temperature to effect bonding between the members. During bonding, a vacuum will be present within chamber 30 of the sealed assembly and the positive gas pressure exerted on the external surfaces of the assembly will insure intimate contact at the contacting interfaces of the members.

The following examples are illustrative of this invention.

*Example I*

Two metal members ¼ inch in cross-sectional diameter and one inch long are prepared from an alloy consisting essentially of, by weight, about 1.5% tin, 0.1% chromium, 0.05% nickel, about 0.12% iron, less than about 0.5% of impurities and the balance being zirconium. One butt end of one of the metal members is plated with a 0.20 mil thick coating of nickel by the chemical displacement method hereinbefore described. The coated butt end of the metal member is placed in contact with a butt end of the other metal member and the two metal members are held in this position by spot welding strips of molybdenum metal along the sides of the members to provide an assembly of the metal members to be bonded. The assembly is placed on a graphite boat and then placed in a vacuum furnace. The assembly is heated to a temperature of about 1000° C., in about 60 minutes and maintained at this temperature for about 60 minutes to effect bonding of the metal members and diffusion of the nickel to the zirconium base alloy. The bonded metal members are cooled in the furnace to a temperature of about 400° C. The time required for the heated assembly to reach this temperature is about two hours. The bonded metal members are removed from the furnace and cooled to room temperature. The molybdenum strips are removed and the bonded metal members are machined to eliminate edge effects at the bond interface. About 0.025 inch is removed from the cross-sectional diameter of the bonded metal members during machining.

Five specimens of the bonded members are prepared in this manner and tensile tests performed on each. The specimens are tested at a rate of 0.05 inch per minute. The average tensile strength of the five specimens is 61,100 pounds per square inch. The tensile strength of specimens prepared from the zirconium alloy employed in the metal members is about 72,600 pounds per square inch. Therefore, it will be evident that the bond is practically as strong as the zirconium metal itself.

A 50% copper–50% silver alloy of 0.25 mil thickness may be applied instead of the nickel coating of Example I and an equally satisfactory bond obtained.

*Example II*

Two metal members, 2⅜ inches by 1½ inches by 80 mils, were prepared from the zirconium base alloy of Example I. One surface of one of the members was plated with a 0.25 mil thick coating of copper by the chemical displacement method hereinbefore described. The two metal members were assembled so that the copper coating was sandwiched between the two members. The periphery of the assembled metal members was fusion arc welded to provide an assembly. The assembly was placed in the cold zone of a vacuum furnace and the furnace was evacuated. The assembly was then moved into the hot zone of the furnace, and helium under pressure admitted to the furnace. The assembly was heated to a temperature of about 1010° C. in about 40 minutes and held at this temperature for about two hours to bond the metal members together. The bonded metal members were removed from the hot zone of the furnace to the cold zone where the bonded members were cooled to room temperature.

Four ½ inch square samples were cut from the bonded members. These samples were exposed to 680° F. pressurized water for a period of 29 days and there was no evidence of any preferential corrosion attack in the areas of the bond interface.

*Example III*

Four nickel bonded samples of zirconium alloy of Example I, were also prepared for corrosion testing. In preparing the four samples the method of Example II was duplicated with the exception that a 0.20 mil nickel coating was employed instead of the 0.25 mil copper coating.

The four samples showed no preferential corrosion attack in the areas of the bond interface when subjected to 680° F. pressurized water for a period of 29 days.

It is to be understood that the above description and drawing are illustrative and not in limitation of the invention.

I claim as my invention:

1. In the method of metallurgically bonding metal members of a first alloy consisting essentially of, by weight, from 0.1% to 2.5% of tin, and a total of at least 0.1% but not exceeding approximately 2% by weight of at least one metal from Period III of the Periodic Table selected from the group consisting of iron, nickel and chromium, carbon not exceeding 0.05%, the balance being zirconium and less than 0.5% of incidental impurities, the steps comprising applying a substantially uniform microscopically thin metal coating of at least one metal selected from the group consisting of nickel, copper, silver, iron and alloys of two or more on at least one of the members at the surfaces where the members are to be metallurgically bonded, placing the members in contact at said surfaces with one another in the position in which they are to be bonded to provide an assembly, heating the assembly in an inert atmosphere to a temperature at which the applied metal and the base metal of the metal member form a fused eutectic alloy at the interface of the metal members, and maintaining the assembly at the temperature until substantially all the metal coating has diffused into the metal members as a component of the eutectic alloy whereby there is produced a strong metallurgical bond between the metal members.

2. An article of manufacture comprising bonded metal members each of the members comprising a first alloy consisting essentially of, by weight, from 0.1% to 2.5% of tin, and a total of at least 0.1% but not exceeding approximately 2% by weight of at least one metal from Period III of the Periodic Table selected from the group consisting of iron, nickel and chromium, carbon not exceeding 0.05%, the balance being zirconium and less than 0.5% of incidental impurities, metallurgically bonded together at the interface thereof, there being dispersed in the first alloy at and between the interfaces of the bonded metal members a relatively low concentration of a eutectic alloy one component of which is zirconium, and the other component of which is selected from the group consisting of nickel, copper, silver, iron, and alloys of two or more.

3. In the method of metallurgically bonding metal members of an alloy consisting essentially of, by weight, from 0.1% to 2.5% of tin, and a total of at least 0.1% but not exceeding approximately 2% by weight of at least one metal from Period III of the Periodic Table selected from the group consisting of iron, nickel and chromium, carbon not exceeding 0.05%, the balance being zirconium and less than 0.5% of incidental impurities, the steps comprising applying to at least one of the metal members at the surfaces where the members are to be bonded a thin coating of a total thickness of from about 0.10 mil to 0.30 mil of nickel, placing the members in contact at said surfaces with one another in the position in which they are to be bonded to provide an assembly, heating the assembly in an inert atmosphere to a temperature of from about 980° C. to 1030° C. to form a fused eutectic alloy at the interface of the assembled members, and maintaining the assembly at this temperature until substantially all the metal coating has diffused into the metal members, and cooling the assembly to room temperature whereby there is produced a strong metallurgical bond between the metal members.

4. An article of manufacture comprising bonded metal members of an alloy consisting essentially of, by weight, from 0.1% to 2.5% of tin, and a total of at least 0.1% but not exceeding approximately 2% by weight of at least one metal from Period III of the Periodic Table selected from the group consisting of iron, nickel and chromium, carbon not exceeding 0.05%, the balance being zirconium and less than 0.5% of incidental impurities, metallurgically bonded together at the interface thereof, there being a small proportion of a zirconium-nickel eutectic alloy dispersed in the base alloy along the interface and in the region adjacent thereto in decreasing concentration with distance from the interface.

5. In the method of metallurgically bonding metal members of an alloy consisting essentially of, by weight, from 0.1% to 2.5% of tin, and a total of at least 0.1% but not exceeding approximately 2% by weight of at least one metal from Period III of the Periodic Table selected from the group consisting of iron, nickel, and chromium, carbon not exceeding 0.05%, the balance being zirconium and less than 0.5% of incidental impurities, the steps comprising applying to at least one of the metal members at the surfaces where the members are to be bonded a thin coating of a total thickness of from about 0.10 mil to 0.30 mil of copper, placing the members in contact with one another at said surfaces in the position in which they are to be bonded to provide an assembly, heating the assembly in an inert atmosphere to a temperature of from about 980° C. to 1030° C. to form at the interface of the members, from the zirconium of the alloy member and the copper of the coating, a molten eutectic zirconium-copper alloy, maintaining the assembly at this temperature for at least 30 minutes until substantially all the eutectic alloy has diffused into the metal members, and cooling the assembly to room temperature, whereby there is produced a strong metallurgical bond between the metal members.

6. An article of manufacture comprising bonded metal members of an alloy consisting essentially of, by weight, from 0.1% to 2.5% of tin, and a total of at least 0.1% but not exceeding approximately 2% by weight of at least one metal from Period III of the Periodic Table selected from the group consisting of iron, nickel, and chromium, carbon not exceeding 0.05%, the balance being zirconium and less than 0.5% of incidental impurities, the members having a metallurgical bond at the interface thereof, there being a dispersion in the zirconium-base alloy of a zirconium-copper eutectic alloy in the region of the interface which decreases in concentration with distance from the interface.

7. In the method of metallurgically bonding metal members of an alloy consisting essentially of, by weight, from 0.1% to 2.5% of tin, and a total of at least 0.1% but not exceeding approximately 2% by weight of at least one metal from Period III of the Periodic Table selected from the group consisting of iron, nickel, and chromium, carbon not exceeding 0.05%, the balance being zirconium and less than 0.5% of incidental impurities, the steps comprising applying to at least one of the metal members at the surfaces where the members are to be bonded a thin coating of a total thickness of from about 0.10 mil to 0.30 mil of iron, placing the members in contact with one another at said surfaces in the position in which they are to be bonded to provide an assembly, heating the assembly in an inert atmosphere to a temperature of from about 980° C. to 1030° C. to form at the interface of the members, from the zirconium of the alloy member and the iron of the coating, a molten eutectic zirconium-iron alloy, maintaining the assembly at this temperature for at least 30 minutes until substantially all the eutectic alloy has diffused into the metal members, and cooling the assembly to room temperature, whereby there is produced a strong metallurgical bond between the metal members.

8. An article of manufacture comprising bonded metal members of an alloy consisting essentially of, by weight, from 0.1% to 2.5% of tin, and a total of at least 0.1% but not exceeding approximately 2% by weight of at least one metal from Period III of the Periodic Table selected from the group consisting of iron, nickel, and chromium, carbon not exceeding 0.05%, the balance being zirconium and less than 0.5% of incidental impurities, the members having a metallurgical bond at the interface thereof, there being a dispersion in the zirconium-base alloy of a zirconium-iron eutectic alloy in the region of the interface which decreases in concentration with distance from the interface.

References Cited in the file of this patent

UNITED STATES PATENTS

| | | |
|---|---|---|
| 2,633,633 | Bogart | Apr. 7, 1953 |
| 2,652,623 | Marden | Sept. 22, 1953 |
| 2,834,101 | Boam | May 13, 1958 |
| 2,857,663 | Beggs | Oct. 28, 1958 |
| 2,859,512 | Dijksterhuis | Nov. 11, 1958 |
| 2,906,008 | Boegehold | Sept. 29, 1959 |
| 2,908,966 | Wagner | Oct. 20, 1959 |

FOREIGN PATENTS

| | | |
|---|---|---|
| 677,213 | Great Britain | Aug. 13, 1952 |

OTHER REFERENCES

WADC Technical Report 52–313 Part I, published November 1952, Wright Air Development Center, Battelle Memorial Institute, Brazing Titanium to Titanium and to Mild and Stainless Steels, 34 pp.

Our next Major Metal Titanium Product, Engineering, pp. 145, 146, November 1949.

Fabrication of a Zirconium-Lined Reaction Vessel (Reprint From Welding Journal, February 1954), Engineering Experiment Station, Oregon State College Reprint No. 49, pages 1 to 7.